Sept. 8, 1959 J. R. BRADLEY 2,902,936
PUMPS FOR METERING LIQUIDS
Filed March 12, 1956 2 Sheets-Sheet 1

INVENTOR
John Ramsay Bradley
BY
Leech & Radue
ATTORNEY

United States Patent Office 2,902,936
Patented Sept. 8, 1959

2,902,936

PUMPS FOR METERING LIQUIDS

John Ramsay Bradley, Harlow New Town, England, assignor to Kontak Manufacturing Co. Limited, Grantham, Lincolnshire, England, a British company Application March 12, 1956, Serial No. 570,919

Claims priority, application Great Britain March 17, 1955

6 Claims. (Cl. 103—38)

This invention is for pumps for metering liquids and it is particularly suitable for applications where it is desirable to be able to operate and control the delivery of the pump from a position remote from the pump and in which the liquid pumped is dangerous or harmful, but the invention is not so limited in its uses.

According to this invention we provide a liquid metering pump which comprises a main pump member giving alternately a pressure and a suction stroke, and in which on each stroke of the main actuating pump liquid is drawn into the system or expelled therefrom through valve means to an expandable and contractable chamber (the actuating chamber) to which and from which liquid is delivered and withdrawn by said pressure and suction strokes, a second expandable and contractable chamber (the delivery chamber) into which liquid is drawn when such chamber expands and from which it is delivered when such chamber contracts, a connection between the actuating and delivery chamber whereby expansion and contraction of the actuating chamber is communicated to the delivery chamber to cause contraction and expansion of the delivery chamber and means for controlling the rate of delivery of the pump by varying the capacity of the actuating chamber.

By this means it is possible to have a constant speed pump and control easily its delivery.

It is also possible to isolate completely the liquid in the pump chamber from the liquid which is being pumped from the system.

The means for varying the actuating chamber may be direct and mechanical.

The actuating chamber may operate directly upon the delivery chamber in which case the two chambers may have a common flexible wall.

Alternatively an intermediate chamber may be placed between them to which the pulsations of the actuating chamber are transmitted and the pulsations of which will cause pulsations of the delivery chamber.

Two examples of this invention are illustrated in the accompanying diagrammatic drawings.

Figure 1:
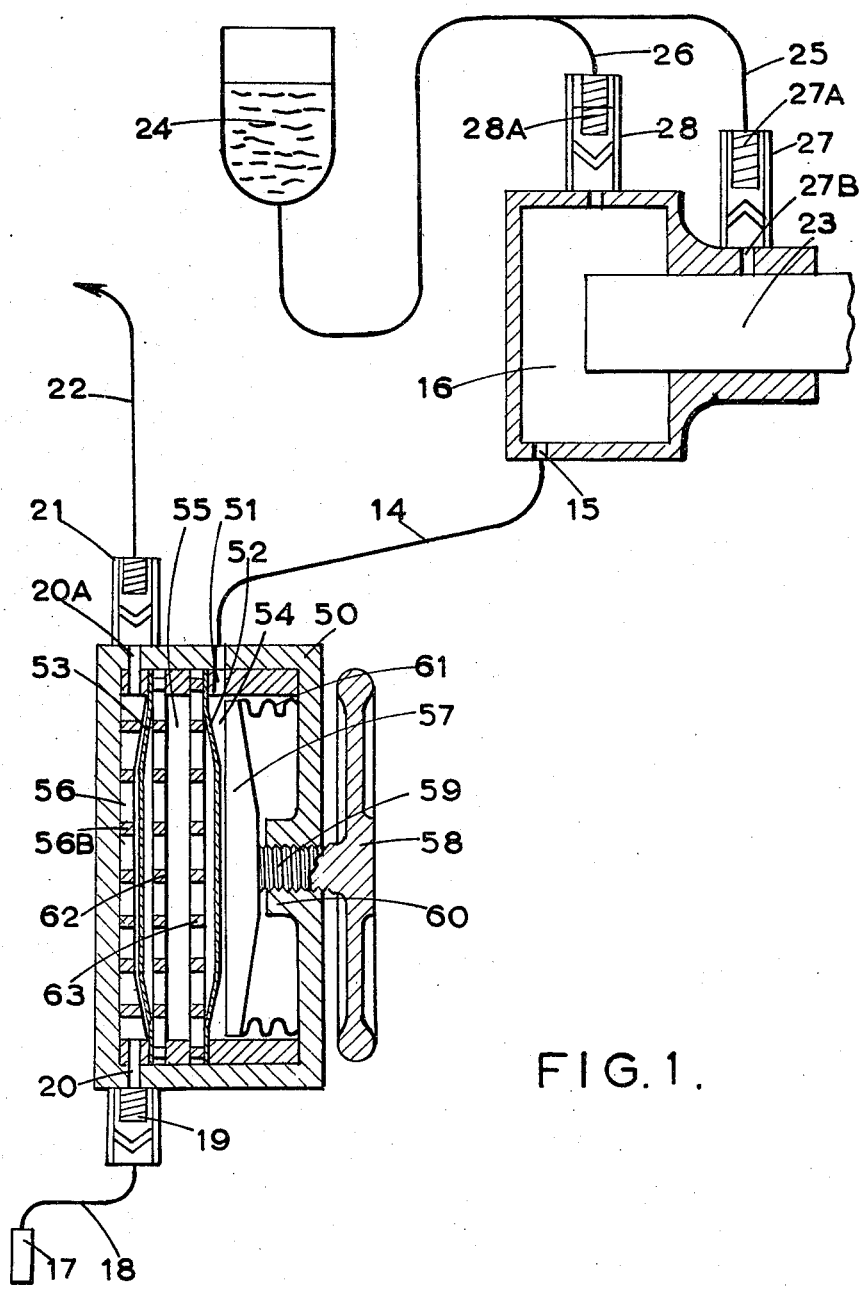
Figure 2:
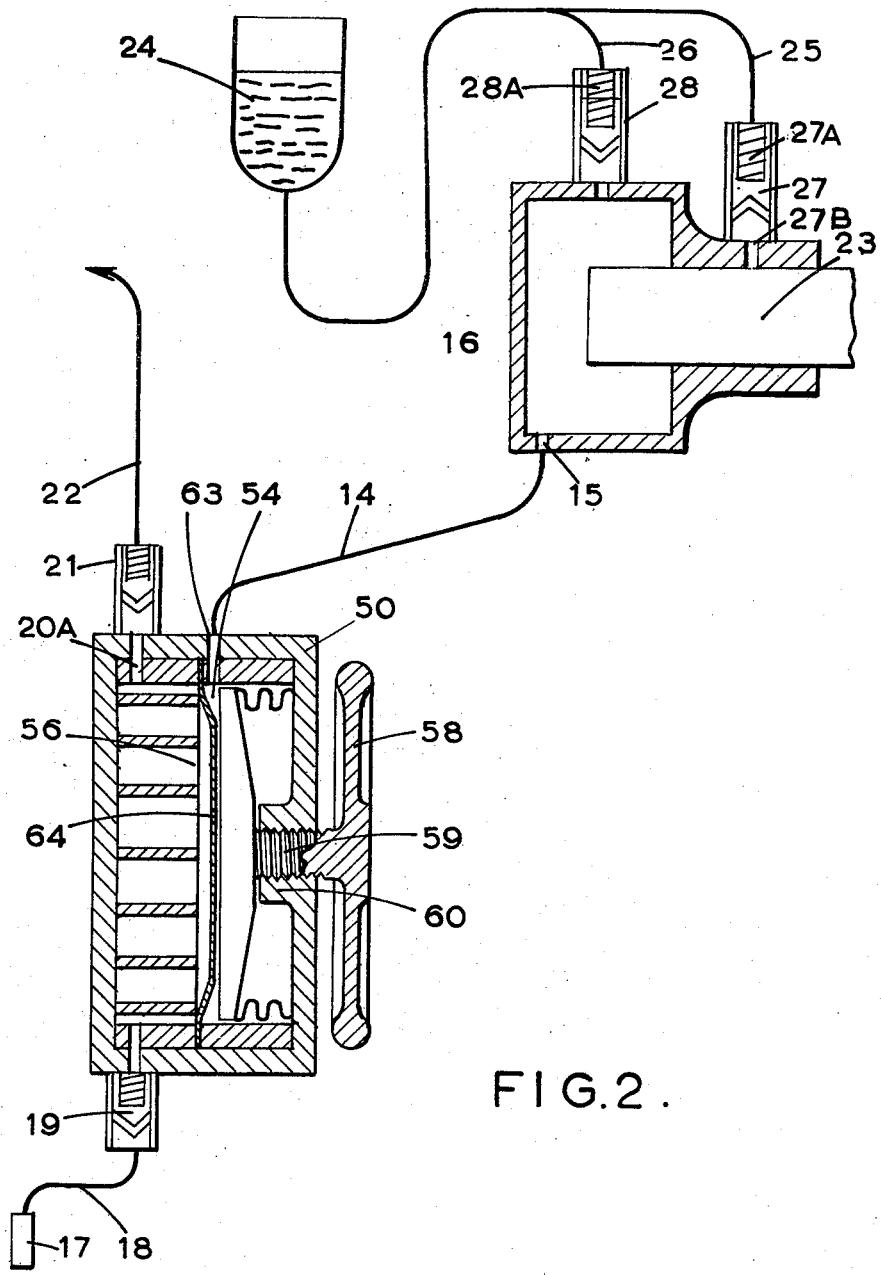

Figure 1 showing an arrangement in which an intermediate chamber is provided between the actuating and delivery chambers, and, Figure 2 an arrangement in which there is no intermediate chamber.

Liquid is delivered via a pipe 14 to the actuating chamber hereafter to be described, from a cylinder 16 via port 15.

In the cylinder 16 reciprocates a piston 23 driven from a prime mover. Cylinder 16 communicates with a liquid reservoir 24 through 25 and 26, through two valves 27 and 28. Valve 28 is loaded by a spring 28A to open when the pressure in the cylinder reaches a preselected figure.

Valve 27 is loaded by a spring 27A and will open when the piston on its suction stroke has uncovered port 27B assuming that the suction then will be sufficient to overcome the spring.

Pipe 14 communicates with the interior of a casing 50 through a port 51. This casing is divided into three portions by two flexible diaphragms 52 and 53.

The portion of the casing 50 to the right of the diaphragm 52 as seen in the drawing, and delineated by the number 54 constitutes the actuating chamber. That portion between the two diaphragms numbered 55 constitutes the intermediate chamber, and that to the left of diaphragm 53 numbered 56 constitutes the delivery chamber.

It will be seen that the pulsations caused in cylinder 16 by reciprocation of piston 23, will cause similar pulsations in the actuating chamber 54. This will be transmitted through the intermediate chamber 55 to the delivery chamber 56.

The expansion and contraction of delivery chamber 56 causes liquid to be drawn from a source 17 through pipe 18 and valve 19 and port 20 into the chamber and delivered therefrom through ports 20A and valve 21 and pipe 22 to the place where the liquid is required to be used.

The volume of the actuating chamber 54 can be varied by means of an adjustable end 57, of chamber 50, which is moveable toward the right or the left as shown in the drawing by means of a hand wheel 58, and threaded shaft 59 engaged in a threaded boss 60 in the wall of chamber 50, shaft 59 engaging in the adjustable end 57 so that its end is rotatable therein.

A metal bellows 61 extends between the edge of the adjustable end 57 and the wall of chamber 50 to close off the space to the right of adjustable end 57 from the interior of casing 50.

By means of the hand wheel 58 the size of the actuating chamber can be increased or reduced and this in turn will control the amount of expansion and contraction of the delivery chamber.

Perforated baffle 63 limits the travel of the diaphragm 52, and perforated support plates 56B and 62 prevent excessive movement of diaphragm 53.

In Figure 2 like parts have like lettering but in this case the intermediate chamber 55 is omitted and a single diaphragm 64 separates the actuating chamber 54 from the delivery chamber 56 and transmits the pulsations from one to the other directly.

It will be appreciated that the valves 28 and 27 define the permissible limits of pressure in the main and actuating pump chamber system. The lower limit may however approach absolute vacuum without putting too great a strain on the system and the port 27B is placed so that valve 27 will not open till this piston position is reached. On each stroke of the main pump piston 23 liquid is taken in and expelled from the system through valves 27 and 28 and this provides that the diaphragm pump will deliver an amount dependent upon the permitted expansion and contraction of the actuating chamber 54. The rate of delivery is therefore controlled entirely by varying the working capacity of the actuating chamber 54.

In operating between fixed pressure limits, all parts of the system subject to hydraulic pressure from the main pump member are subjected to exactly the same stresses at the beginning and end of each pumping stroke, and in consequence elastic distortions of these parts are always the same at each end of each stroke. In consequence there is no change in the characteristics of the pump due to these distortions, irrespective of the delivery pressure or the rate of delivery against which the pump is operating. Under these conditions, the quantity delivered from the delivery chamber by the pump per stroke is accurately determined by the permissible expansion and contraction of the actuating chamber and by no other variable except possibly temperature changes.

The hand wheel 58 may be used in conjunction with a scale for calibrating the delivery of the pump.

The hand wheel may also be replaced by some form of motor allowing for remote control.

What I claim is:

1. A liquid metering pump which comprises a main actuating pump member giving alternately a pressure and a suction stroke, an expandable and contractable chamber to which and from which liquid is delivered and withdrawn by said pressure and suction strokes, a diaphragm forming a flexible wall, a non-flexible wall positioned to be abutted by said diaphragm on the suction stroke, said flexible and non-flexible walls defining said expansible and contractable chamber, a second expandable and contractable chamber into which a second liquid is drawn when such chamber expands and from which it is delivered when such chamber contracts, an inlet valve and an outlet valve for said second chamber, the first and second chambers being so associated that expansion and contraction of the first chamber is communicated to the second chamber to cause contraction and expansion of the second chamber, and means for controlling the rate of delivery of the pump, said means being connected to move said wall of the first chamber to vary the capacity thereof, the displacement of the main pump being larger than the maximum volume of the said first chamber.

2. A metering pump as claimed in claim 1 in which the first and second chambers are contained in a common casing separated by said flexible diaphragm.

3. A metering pump as claimed in claim 1 in which an intermediate chamber is arranged between the first chamber and the second chamber said intermediate chamber having said flexible wall separating said intermediate chamber from the first chamber and another flexible wall separating said intermediate chamber from the second chamber whereby the pulsations in the first chamber are transmitted to the second chamber.

4. A metering pump which comprises a main pump member giving alternately a pressure and a suction stroke, an expandable and contractable chamber to which and from which liquid is delivered and withdrawn by said pressure and suction strokes, a diaphragm forming a flexible wall, a non-flexible wall positioned to be abutted by said diaphragm on the suction stroke, said flexible and non-flexible walls defining said expansible and contractable chamber, a second expandable and contractable chamber into which a second liquid is drawn when such chamber expands and from which it is delivered when such chamber contracts, an inlet valve and an outlet valve for said second chamber, the first and second chambers being so associated that expansion and contraction of the first chamber is communicated to the second chamber to cause contraction and expansion of the second chamber, said first chamber non-flexible wall being movable therein to vary the capacity of the first chamber and means operable from outside the first chamber to move said wall, the displacement of the main pump being larger than the maximum volume of said first chamber.

5. A metering pump as claimed in claim 4 in which said movable wall is associated with an expandable bellows which prevents liquid from passing behind the same.

6. A metering pump which comprises a main pump chamber with a piston reciprocating therein giving alternately a pressure and suction stroke, including an inlet valve through which liquid is drawn into the pump on each stroke and an exhaust valve through which liquid is expelled from the pump on each stroke, the inlet valve communicating through a port so placed that the depression in the pump chamber approaches absolute zero before the port is opened, an expandable and contractable chamber to which and from which liquid is delivered and withdrawn by said pressure and suction strokes, a second expandable and contractable chamber into which liquid is drawn when such chamber expands and from which it is delivered when such chamber contracts, a connection between the first and second chambers, including a common diaphragm therebetween whereby expansion and contraction of the first chamber is communicated to the second chamber to cause contraction and expansion of the second chamber and means for controlling the rate of delivery of the pump, said means varying the capacity of the first chamber, but within the limits of the volumetric capacity of the main pump.

References Cited in the file of this patent

UNITED STATES PATENTS

| | | |
|---|---|---|
| 1,101,266 | Franklin | Jan. 23, 1914 |
| 1,680,204 | Charles | Aug. 7, 1928 |
| 1,771,170 | Eule | July 22, 1930 |
| 2,691,943 | Wilson | Oct. 19, 1954 |
| 2,764,097 | Browne | Sept. 25, 1956 |

FOREIGN PATENTS

| | | |
|---|---|---|
| 673,850 | France | Jan. 20, 1930 |